June 14, 1938.                L. F. BAASH ET AL                    2,120,386
                          CONTROL FOR BORING MACHINES
                             Filed May 26, 1936              2 Sheets-Sheet 1
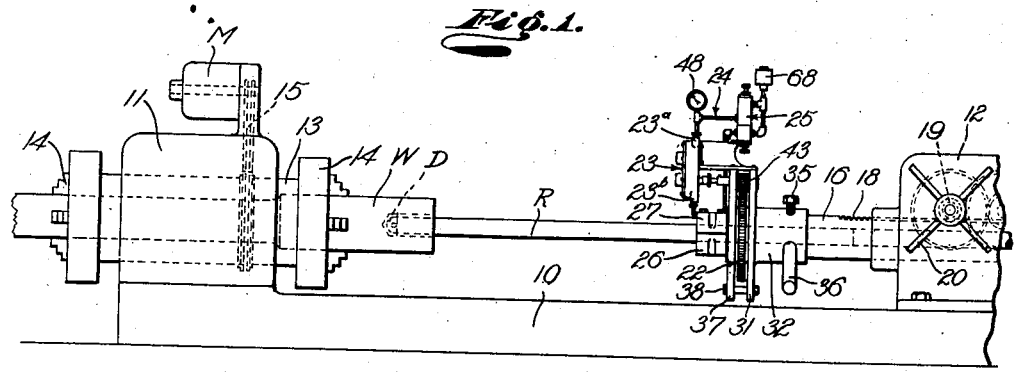
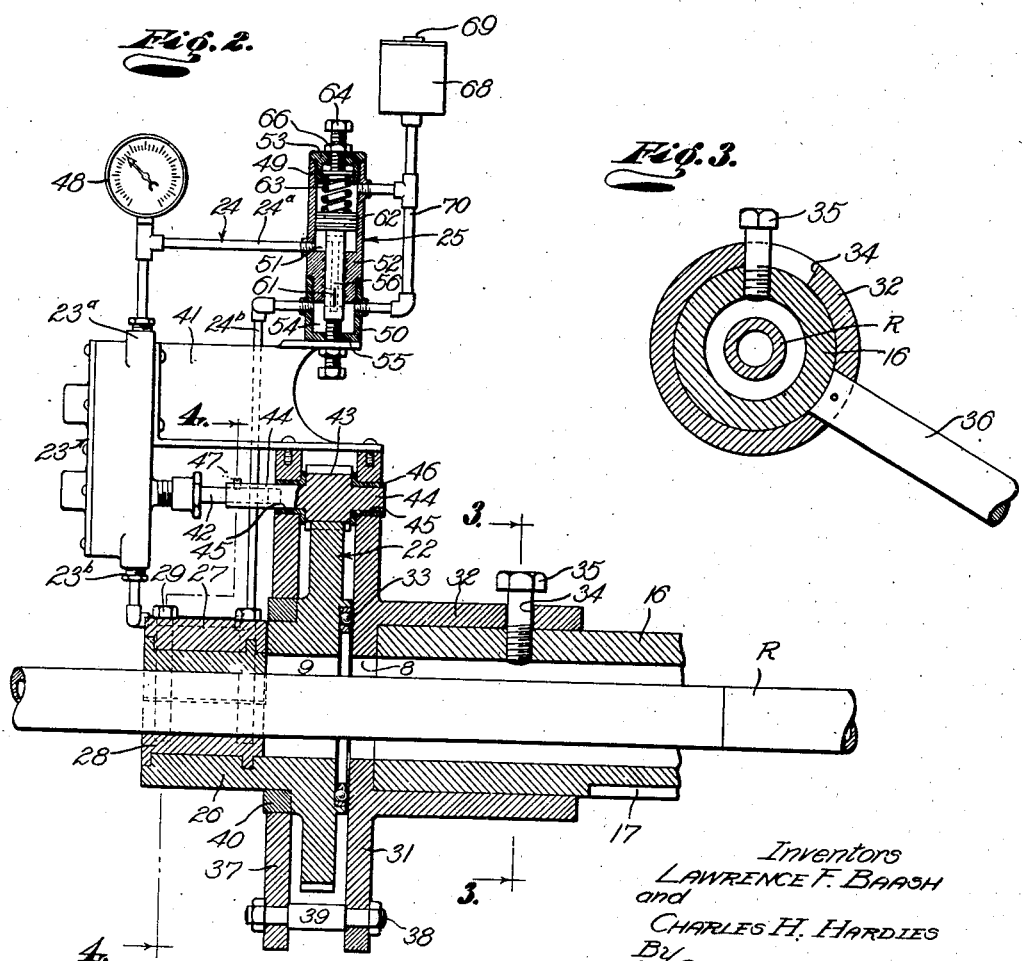
Inventors
LAWRENCE F. BAASH
and
CHARLES H. HARDIES
By
Their Attorney June 14, 1938.  L. F. BAASH ET AL  2,120,386
CONTROL FOR BORING MACHINES
Filed May 26, 1936  2 Sheets-Sheet 2
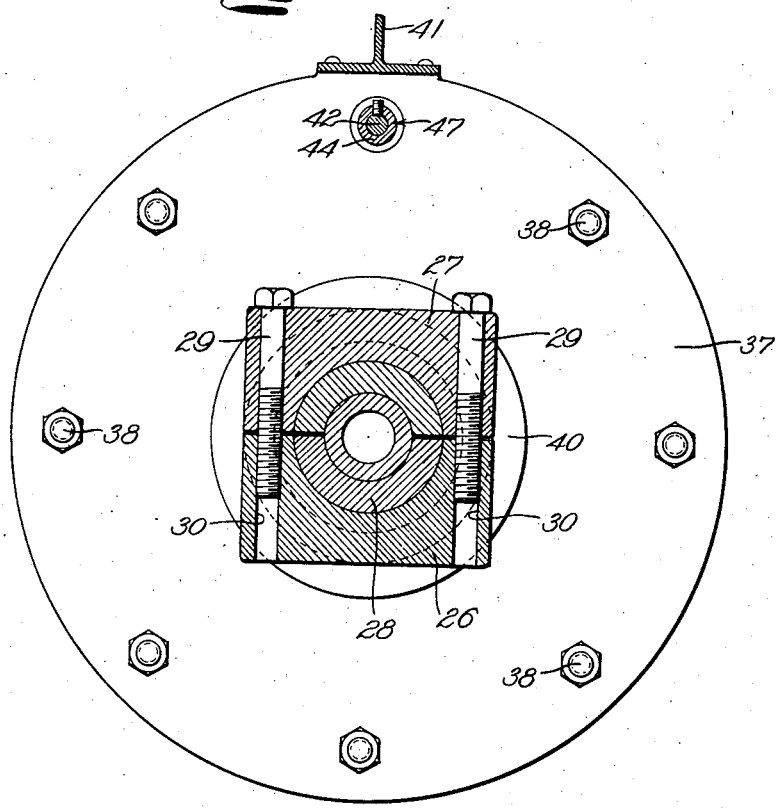
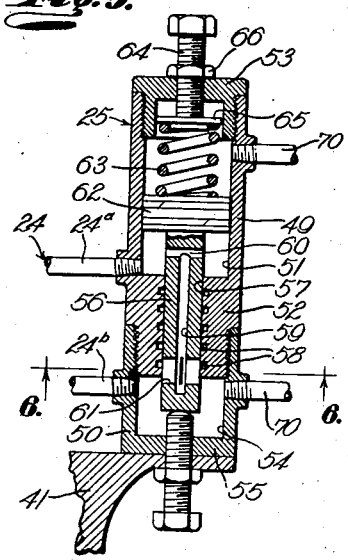
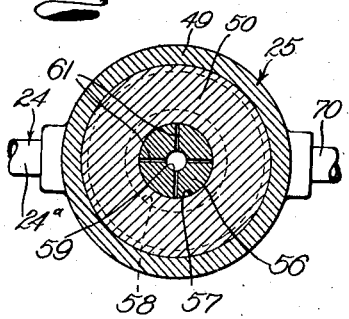
Inventors
LAWRENCE F. BAASH
and
CHARLES F. HARDIES
By
Their Attorney Patented June 14, 1938

2,120,386

UNITED STATES PATENT OFFICE 2,120,386

CONTROL FOR BORING MACHINES

Lawrence F. Baash and Charles H. Hardies, Los Angeles, Calif., assignors to Baash-Ross Tool Company, Los Angeles, Calif., a corporation of California Application May 26, 1936, Serial No. 81,829

16 Claims. (Cl. 77—3)

This invention relates to drilling or boring machinery and relates more particularly to controls for boring machines. A general object of this invention is to provide a practical, dependable and automatic control for a boring machine.

Another object of this invention is to provide a control for a boring machine that automatically prevents any substantial deviation of the drill from the desired course. The control of the present invention is adapted for application to a machine for drilling bores of great length, and to other machines, and is operable to correct or prevent uni-directional deflection of the drill from the proper course, whether caused by dulling of the drill on one side, the character of the work, or other causes.

Another object of this invention is to provide an automatic control for a boring machine that may be regulated to adapt the machine for torque controlled drilling and for the handling of work of different characters and materials and to effect the proper operation of drills of different diameters operating in different materials.

Another object of this invention is to provide an automatic control for a boring machine that indicates to or informs the operator of the dulling of the drill and the failure of the drill to operate properly.

Another object of this invention is to provide an automatic control for a boring machine that operates by or that is under the control of the torque on the drill rod to automatically vary the differential in rotation between the work and the drill and thus effect the proper operation of the drill under various conditions.

Another object of this invention is to provide a torque governed control for a boring machine that automatically provides for a gradual increase in the differential in rotation of the drill and the work as the drill gradually dulls, thus automatically compensating for dulling of the drill.

A further object of this invention is to provide an automatic control of the character mentioned that is simple and inexpensive to manufacture and to install or embody in a boring machine.

The various objects and features of our invention will be fully understood from the following detailed description of a typical preferred form and application of the invention, throughout which description reference is made to the accompanying drawings, in which:

Fig. 1 is a side elevation of a portion of a boring machine illustrating the control of the present invention in operating position thereon. Fig. 2 is an enlarged vertical detailed sectional view of the control and the adjacent portions of the machine. Fig. 3 is a vertical detailed sectional view taken as indicated by line 3—3 on Fig. 2. Fig. 4 is an enlarged vertical detailed sectional view taken as indicated by line 4—4 on Fig. 2. Fig. 5 is an enlarged vertical detailed sectional view of the valve mechanism of the control. Fig. 6 is an enlarged transverse sectional view taken as indicated by line 6—6 on Fig. 5.

The control provided by this invention is adapted for application to or embodiment in boring machines of various characters. In the following detailed description we will describe the control as embodied in or applied to one form of boring machine adapted for making bores of great length, it being understood that the invention is not to be construed as limited or restricted to this particular application of the invention.

The boring machine illustrated in the drawings comprises a bed 10, a driving head 11 on the bed 10 which rotates the work, and a tail piece 12 on the bed 10 which feeds the drill. A tubular drive spindle 13 extends horizontally through the head 11 and carries suitable chucks 14 at opposite sides of the head. The work W is adapted to extend through the head 11 to project from both ends of the head. The chucks 14 of course grip the work W so that it is turned by or with the spindle 13. A driving motor M is provided on the head 11. A suitable drive 15 is provided between the motor M and the spindle 13.

A drill D may be fed into one end of the rotating work W or a drill D may be fed into each end of the rotating work by separate drill feeds. In the portion of the machine illustrated there is one drill feed carried by the tail piece 12 for feeding the drill D into one end of the work W. The control of the present invention is shown in position to govern the operation or action of the drill D. It is to be understood that where a drill is fed into each end of the work W a control of the present invention may be provided to govern the action of each drill D independently.

The drill feed shown includes a tubular feed member 16 extending through the tail piece 12. The feed member 16 is longitudinally shiftable but is held against rotation by a key (not shown) cooperating with a key-way 17. In the particular machine illustrated rack teeth 18 are provided on the member 16 and a suitable drive pinion 19 in the tail piece 12 cooperates with the rack teeth 18 to feed the member 16. The pinion 19 may be power driven to advance the member 16 at a constant rate. A wheel 20 is operatively associated with the pinion 19 to provide for the manual advancement and retraction of the member 16. A drill rod R extends longitudinally through the member 16 with substantial clearance and carries the bit or drill D. The rod R may be made up of several lengths or sections and may be increased in length by the addition of sections as required, during the progress of the boring operation. The rod R is shown as tubular to carry lubricating and cutting fluid to or from the drill D. It is to be understood that the drill rod R may be suitably supported in the tail piece 12 or elsewhere for free rotation. The member 16 feeds or advances the rod R through the medium of the control, as will be subsequently described.

The improved control of the present invention includes, generally, a driving member or gear 22 secured to the rod R to be rotated thereby, a pump 23 driven or operated by the gear 22, a liquid circulating conduit 24 connecting the discharge 23ª and the inlet 23ᵇ of the pump 23, and regulable and automatically variable means 25 connected in the conduit 24 for controlling the flow therethrough to govern the rotation of the drill rod.

The member or gear 22 of the control is removably secured to the rod R to move longitudinally therewith and to be rotated thereby. An opening 9 in the gear 22 receives the rod R with clearance. The gear 22 preferably has a boss 26 of substantial length projecting in the direction of the head 11. A portion of the boss 26 is in the nature of a removable cap 27. A bushing 28 is provided in the boss 26 and the cap 27 to engage about the drill rod R. Screws 29 pass through openings in the cap 27 and thread into openings 30 in the boss 26. The screws 29 may be tightened down to securely clamp the gear 12 to the rod R. It will be readily understood how the screws 29 may be loosened to allow movement of the gear 12 along the rod R when the feed member 16 is to be returned at the end of each stroke.

It is preferred to arrange the gear 22 adjacent the active end of the feed member 16 to form an abutment for the transmission of the longitudinal feed pressures from the member 16 to the drill rod R. A disc or plate 31 is provided at the end of the member 16 and has an opening 8 freely passing the rod R. A face of the plate 31 is adapted to engage the outer end of the member 16 and the tubular boss 32 receiving the end portion of the member. An anti-friction thrust bearing 33 is arranged between opposing surfaces of the plate 31 and the gear 22 for the transmission of the feed pressures to the drill rod R. A circumferential slot 34 is provided in the boss 32 and a projection or screw 35 on the member 16 extends through the slot 34. A handle or lever 36 is provided on the boss 32 whereby the operator may turn or move the plate 31 to test or feel the action of the drill D. A plate or disc 37 is provided at the inner side of the gear 22 to surround its boss 26. Bolts or ties 38 connect the plate 31 and the disc 37. Suitable spacers 39 may be provided on the ties 38 to maintain the desired spacing of the plate and disc. A suitable bearing 40 may be provided between the interior of the disc 37 and the boss 26.

The pump 23 is driven or operated by the drill rod R through the gear 22 and other parts to circulate a suitable liquid through the means 25. The pump 23 is preferably a positive action pump such as a gear pump. In the typical arrangement illustrated the pump 23 is supported on the plate 31 and the disc 37 through the medium of a suitable bracket 41. The shaft 42 of the pump 23 is rotated by the gear 22 through the medium of a pinion 43. The trunnions 44 of the pinion 43 are rotatably supported in openings 45 in the plate 31 and disc 37. Suitable bearings or bushings 46 may rotatably support the pinion trunnions 44 in the openings 45. The pinion 43 is rotatably supported to mesh with the gear 22. One trunnion 44 of the pinion 43 is suitably connected with the pump shaft 42 at 47. It will be apparent how the pump 23 is operated or driven by rotation of the drill rod R through the medium of the gear 22 and pinion 43.

The conduit 24 is provided to conduct or circulate a suitable liquid between the pump discharge 23ª and the pump intake 23ᵇ. The conduit 24 and the control means 25 connected therein comprise a closed system and liquid may be continuously circulated therethrough during operation of the pump. A pressure gauge 48 is connected in the high pressure side or portion 24ª of the conduit 24. The gauge 48 may be calibrated to indicate the torque on the drill rod R, as will be more fully described.

The means 25 offers a regulable and automatically variable resistance to flow through the conduit 24 and thus offers a regulable and variable resistance to rotation of the drill rod R. The means 25 may include a body formed of two sections 49 and 50. The section 49 is chambered or provided with a cylinder 51. The inner end wall 52 of the section 49. The wall 52 is preferably quite thick. A head or cap 53 is provided on the section 49 to close the other end of the cylinder 51. The section 50 may be threaded on the wall 52 as clearly illustrated in Fig. 5. The section 50 is hollow, having a chamber 54. The inner end of the chamber 54 is closed by the wall 52 while an integral wall 55 of the section 50 closes the other end of the chamber. The high pressure portion 24ª of the conduit 24 communicates with the cylinder 51 and the low pressure portion 24ᵇ of the conduit communicates with the chamber 54. The conduit preferably communicates with the cylinder 51 adjacent its inner end.

The means 25 includes a valve 56 controlling communication between the cylinder 51 and the chamber 54. The valve 56 is in the nature of a rod or stem slidable longitudinally in an opening 57 in the wall 52. The valve 56 projects into the cylinder 51 and the chamber 54. Grooves 58 may be provided in the wall of the opening 57 to provide liquid seals about the valve 56. A longitudinal port 59 of relatively small fluid capacity is provided in the valve 56. Ports 60 in the valve 56 place one end of the port 59 in communication with the cylinder 51. Ports 61 are provided in the valve 56 to connect the other end of the port 59 with the chamber 54. The ports 61 are preferably in the form of elongate slots, as best illustrated in Fig. 2 of the drawings. The small ports 59, 60 and 61 operate to materially cut down the flow of liquid and thus provide a lower pressure in the chamber 54 than is present in the cylinder 51.

The valve 56 is governed or controlled by a piston 62 and a spring 63. The piston 62 is secured to the valve 56 to operate in the cylinder 51. The piston 62 may be provided with suitable rings. The spring 63 is arranged in the outer portion of the cylinder 51 to bear or press inwardly on the piston 62. It will be observed that when the speed of the pump 23 increases pressure in the cylinder 51 increases to force the piston 62 outwardly against the action of the spring 63. Outward movement of the piston 62 results in partial closing off or lessening of the communication of the ports 61 with the chamber 54 to further retard the flow from the pump 23 and produces an increased back pressure on the pump. This increased back pressure slows the pump 23 and thus reduces the rate of rotation of the rod R. The spring 63 is preferably regulable whereby the action of the valve 56 may be controlled by the operator. A screw 64 is threaded through an opening in the cap 53 and carries a washer or head 65 for engaging the outer end of the spring 63. The screw 64 may be readily adjusted to vary the compression on the spring 63. A lock nut 66 may be provided to lock or set the screw 64 in the selected position.

A pressure accumulator and reservoir 68 may be provided in connection with the means 25. The reservoir 68 is preferably positioned above the body section 49 of the means 25. The reservoir 68 is normally closed and may be provided with a removable cover 69 to facilitate filling. A pipe or conduit 70 connects the reservoir 68 with the chamber 54 and the portion of the cylinder 51 above the piston 62. The conduit 70 maintains a uniform low pressure in the chamber 54 and the outer portion of the cylinder 51 and the reservoir 68 is automatically operable to replenish the liquid in the system.

In operation the control of the present invention may be associated with the boring machine as illustrated. When arranged in this manner the control is movable with the feed member 16 and the gear 22 is secured to the rod R to turn therewith. In the arrangement illustrated the work W is driven by the head 11 and the control offers resistance to rotation of the drill rod R. Circulation fluid or cutting fluid may be circulated to the drill D as found most desirable.

The feed member 16 urges the drill D against the work W and the rotating work W engaged by the drill tends to rotate the drill and its rod R. The spring 63 may be adjusted by means of the screw 64 to urge the valve 56 to a position where the control offers a selected or desirable resistance to rotation of the drill rod R. For example, assuming that the work W is to be rotated at 200 R. P. M. the control may be adjusted by means of the screw 64 to resist rotation of the rod R to the extent that the rod will turn at the rate of 50 R. P. M. when the drill D is fed into the work at a selected feed rate. The differential in rotation of the work W and the rod R is such that the drill D has a suitable drilling action. The relatively slow rotation of the drill rod R and the drill D prevents the drill from deviating from the desired course or from the axis of rotation of the work W. For example, if the drill D is dull on one side the relatively slow rotation of the drill constantly changes the rotative position of this dull portion and the drill does not tend to deviate from the course concentric with the axis of rotation of the work W. The gauge 48 at all times indicates to the operator the torque present on the drill rod R. The pump 23 is driven by the drill rod R through the medium of the gear 22 and the pinion 43 and the means 25 offers resistance to flow of the liquid in the system thus maintaining a back pressure on the pump 23. This back pressure on the pump 23 is, of course, proportional to the speed of rotation of the drill rod R and the torque on the rod R resulting from the resistance to rotation offered by the pump 23. Thus the gauge 48 at the high pressure side of the pump 23 may be calibrated to definitely indicate the torque on the rod R resulting from the engagement of the drill D with the work W.

As the boring operation progresses the drill D may become worn or dulled. As the drill wears or becomes dull the engagement of the rotating work with the drill tends to increase the torque on the rod R. Increased torque on the rod R of course tends to increase the speed of operation of the pump 23. When the speed of operation of the pump 23 increases the pump has a greater output and develops an increased pressure in the cylinder 51. The increased pressure in the cylinder 51 tends to move the piston 62 outwardly in the cylinder against the action of the spring 63. The outward movement of the piston 62 moves the valve 56 outwardly so that the extent of communication of the ports 61 with the chamber 54 is diminished. This, of course, results in a reduced flow from the cylinder 51 to the chamber 54 and increased back pressure on the pump 23. Increased back pressure on the pump 23 results in increased resistance to turning of the rod R. Accordingly, as the drill dulls or becomes worn the rod R and the drill D turn at a slower rate. In other words, as the drill becomes worn or dull the differential in rotation of the work W and the rod R gradually increases. The increase in differential of rotation of the work W and drill rod R automatically compensates for wearing of the drill and has the same effect as increasing the speed of rotation of the work W relative to the drill.

The operator by observing the gauge 48 may readily determine when the torque on the rod R becomes excessive. In the event that the drill D is imperfect or excessively worn, or is failing to perform for any reason whatsoever, the torque on the rod R of course increases, resulting in a high reading on the gauge 48. This high reading on the gauge 48 will indicate to the operator that the drill D is failing to operate correctly and the drilling operation may be suspended.

At the forward end of the stroke of the feed member 16 it is desirable to free the control from the rod R to permit the control to be returned with the member 16 for another stroke of the member. The screws 29 may be loosened whereupon the control is free for longitudinal movement along the rod R with the member 16. When the member 16 has been returned to the starting position the screws 29 may be tightened down to again clamp the gear 22 to the rod R and thus condition the control for further operation.

Having described only a typical preferred form and application of our invention, we do not wish to be limited or restricted to the specific details herein set forth, but wish to reserve to ourselves any variations or modifications that may appear to those skilled in the art or fall within the scope of the following claims.

Having described our invention, we claim:

1. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and means responsive to the fluid pressure developed by the pump for governing the discharge of the pump and thus govern the rotation of said rotatable part.

2. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and manually regulable means for offering resistance to the discharge of the pump to thus offer resistance to rotation of said rotatable part.

3. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and an automatic valve responsive to the pressure developed by the pump for restricting the discharge of the pump to resist the rotation of said rotatable part.

4. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and variable means responsive to the pressure developed by the pump for maintaining a back pressure on the pump to resist the rotation of the said rotatable part and thus control the differential in rotation of said parts.

5. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and variable means responsive to the pressure developed by the pump for maintaining a back pressure on the pump to resist the rotation of the said rotatable part and thus control the differential in rotation of said parts, said means including, a spring urged valve restricting the flow from the pump.

6. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and variable means maintaining a back pressure on the pump to control the differential in rotation of said parts, said means including, a valve governing the discharge from the pump to control the resistance to rotation of said rotatable part by the pump, and manual means for regulating the valve.

7. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and means responsive to increased output of the pump for diminishing the discharge of the pump to thus govern the rotation of said rotatable part, said means including, a conduit connecting the discharge and inlet of the pump, and a spring urged flow governing valve controlling said conduit.

8. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and means governing the discharge of the pump to thus govern the rotation of said rotatable part, said means including, a valve governing the discharge from the pump operable to automatically diminish the discharge when the speed of the pump increases, and means for manually regulating the valve.

9. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and means governing the discharge of the pump to thus govern the rotation of said rotatable part, said means including, a conduit connecting the discharge and inlet of the pump, a spring urged flow governing valve controlling said conduit, and a gauge connected in said conduit to indicate the torque on said rotatable part.

10. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and means governing the discharge of the pump to thus govern the rotation of said rotatable part, said means including a conduit receiving the discharge of the pump, a body having a cylinder and a discharge port, the cylinder receiving the liquid from the conduit, a valve controlling the discharge from said port, and a piston in the cylinder operatively associated with the valve to effect a reduction in flow through the port upon an increase in pressure in the cylinder.

11. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and means governing the discharge of the pump to thus govern the rotation of said rotatable part, said means including a conduit receiving the discharge of the pump, a body having a cylinder and a discharge port, the cylinder receiving the liquid from the conduit, a valve controlling the discharge from said port, a piston in the cylinder operatively associated with the valve to effect a reduction in flow through the port upon an increase in pressure in the cylinder, and a spring acting on the piston to balance it against pressure in the cylinder.

12. A control for a boring machine having a driven rotating part, and a rotatable part, one part being a work holder, the other part being a drill carrying rod, said control including, a pump, a drive between the pump and said rotatable part whereby the pump is driven by the rotation of said rotatable part resulting from engagement of the drill with the work, and means governing the discharge of the pump to thus govern the rotation of said rotatable part, said means including a conduit receiving the discharge of the pump, a body having a cylinder and a discharge port, the cylinder receiving the liquid from the conduit, a valve controlling the discharge from said port, a piston in the cylinder operatively associated with the valve to effect a reduction in flow through the port upon an increase in pressure in the cylinder, a spring acting on the piston to balance it against pressure in the cylinder, and means for regulating the spring.

13. A boring machine including, means for rotating a piece of work, a rotatable boring rod, a member for feeding the rod, a gear secured to the rod and transmitting the feed pressure thereto from the member, a pump driven by the gear, and means maintaining a back pressure on the pump discharge and responsive to increased fluid pressure developed by the pump to offer increased back pressure to said discharge and thus retard rotation of the boring rod.

14. A boring machine including, means for rotating a piece of work, a rotatable boring rod, a member for feeding the rod, a gear secured to the rod and transmitting the feed pressure thereto from the member, a pump driven by the gear, a conduit connecting the inlet and the discharge of the pump, and a spring urged valve in the conduit operable to provide an increased back pressure on the pump upon an increase in the speed of rotation of the rod.

15. A boring machine including, means for rotating a piece of work, a rotatable boring rod, a member for feeding the rod, a gear secured to the rod and transmitting the feed pressure thereto from the member, a pump driven by the gear, a conduit connecting the inlet and the discharge of the pump, a liquid reservoir in communication with the conduit, and a spring urged valve in the conduit operable to provide an increased back pressure on the pump upon an increase in the speed of rotation of the rod.

16. A boring machine including, means for rotating a piece of work, a rotatable boring rod, a member for feeding the rod, a gear secured to the rod and transmitting the feed pressure thereto from the member, a pump driven by the gear, a conduit connecting the inlet and the discharge of the pump, a spring urged valve in the conduit operable to provide an increased back pressure on the pump upon an increase in the speed of rotation of the rod, and means for varying the action of the valve.

LAWRENCE F. BAASH.
CHARLES H. HARDIES.